United States Patent

Okada

[15] 3,705,260

[45] Dec. 5, 1972

[54] VIDEO SIGNAL CONTROL CIRCUIT FOR COLOR TELEVISION

[72] Inventor: Takashi Okada, Yamato, Japan

[73] Assignee: Sony Corporation, Tokyo, Japan

[22] Filed: Aug. 19, 1971

[21] Appl. No.: 173,104

[30] Foreign Application Priority Data

Aug. 21, 1970 Japan ..............................45/73354

[52] U.S. Cl. ..............................................178/5.4 R

[51] Int. Cl. ..............................................H04n 9/48

[58] Field of Search......................178/5.4 R, 5.4 AC

[56] References Cited

UNITED STATES PATENTS

| | | | |
|---|---|---|---|
| 3,465,095 | 9/1969 | Hansen et al. | 178/5.4 R |
| 3,637,923 | 1/1972 | Poppy | 178/5.4 R |

*Primary Examiner*—Robert L. Griffin
*Assistant Examiner*—John C Martin
*Attorney*—Lewis H. Eslinger et al.

[57] ABSTRACT

In a color television receiver in which a luminance signal and a chrominance signal are separated from a composite color video signal for amplification and color demodulation and then both of the luminance and chrominance signals are supplied to a color cathode ray tube to produce color images on the screen of the tube, a signal control circuit arrangement for changing the levels of the chrominance and luminance signals simultaneously without varying the pedestal level in response to the brightness of the color images on the screen, thereby to ensure faithful reproduction of color images on the screen of the color cathode ray tube.

9 Claims, 4 Drawing Figures

INVENTOR.
TAKASHI OKADA
BY
[signature]

PATENTED DEC 5 1972 3,705,260

INVENTOR.
TAKASHI OKADA
BY
Lewis H. Eslinger

INVENTOR.
TAKASHI OKADA
BY

VIDEO SIGNAL CONTROL CIRCUIT FOR COLOR TELEVISION

BACKGROUND OF THE INVENTION

1. Field of the Invention

This invention relates generally to circuit arrangements for color television receivers, and more particularly to control circuit arrangements for changing the levels of a chrominance signal and a luminance signal simultaneously without varying the pedestal level in response to the brightness of an image on a color cathode ray tube thereby to reproduce a color image with high fidelity on the tube.

2. Description of the Prior Art

Generally, in color television receivers a composite color television signal is detected and then separated into luminance and chrominance signals. These signals are amplified by independent circuits and the chrominance signal is further subjected to synchronous detection with a detecting axis of a predetermined phase and then mixed with the luminance signal by a matrix circuit to reproduce a color video signal. The reproduced color video signal is supplied to a color cathode ray tube. In some cases, the luminance and chrominance signals are not mixed with each other but, instead, they are supplied to the cathode ray tube through separate input terminals to be mixed with each other in the cathode ray tube. In order that the reproduced color video signal obtained by mixing both the luminance and chrominance signals in the matrix circuit or in the color cathode ray tube may correspond accurately to a transmitted signal, it is required that the luminance and chrominance signals vary in amplitude with respect to each other in such a way as to maintain the ratio between them substantially constant. It is also required that their reference levels, for example the pedestal levels, be maintained constant.

The luminance signal is usually transmitted with its DC component; but when the color cathode ray tube is supplied with a video signal of extremely high DC level, for example, when the level of the video signal is high and the brightness is very great, excellent color pictures cannot be reproduced. Recently, a system has been proposed for controlling the average DC level of the video signal fed to the color cathode ray tube in response to average brightness of the reproduced picture (the average DC level of the video signal) to ensure reproduction of excellent color pictures. This may be accomplished by using an automatic brightness limiter.

With a conventional automatic brightness limiter, brightness on the screen of the color cathode ray tube is detected and the detected signal is changed into a DC signal. This signal is then supplied to a luminance signal amplifier and a video output amplifier to control the DC components of signals derived at the outputs of the luminance signal amplifier and the video output amplifier. As a result, when the average DC level of the luminance signal is high, as when the level of the video signal is high, the signal derived at the video output amplifier is made to decrease the DC level of the signal as a whole. Accordingly, with the conventional automatic brightness limiter, when the amplitude of the video signal is great, its pedestal level (black level) becomes lower. This causes black distortion on the screen of the picture tube and makes faithful color picture reproduction impossible. For example, when the amplitude of the video signal is great, the skin color of a human being appears blackish. Therefore, even if the levels of the luminance and chrominance signals are controlled in such a way as to vary with each other, faithful color picture reproduction is impossible.

SUMMARY OF THE INVENTION

It is an object of this invention to provide a color television receiver which produces a color image with high fidelity.

Another object of this invention is to provide a color television signal control circuit that changes the level of chrominance and luminance signals simultaneously in response to brightness of a color image without varying a pedestal level and does so in a way that produces faithful color video signals to be supplied to a color cathode ray tube.

Another object of this invention is to provide a color television receiver signal control circuit that varies an average DC level of a color video signal without changing its pedestal level in response to brightness of an image on a color cathode ray tube.

Still another object of this invention is to provide a circuit for controlling a color video signal so as to produce a color image of good quality even though a video signal of relatively great amplitude is supplied to a color cathode ray tube.

Other objects, features and advantages of this invention will become apparent from the following description taken in conjunction with the accompanying drawings.

DESCRIPTION OF THE PREFERRED EMBODIMENTS

Figure 1:
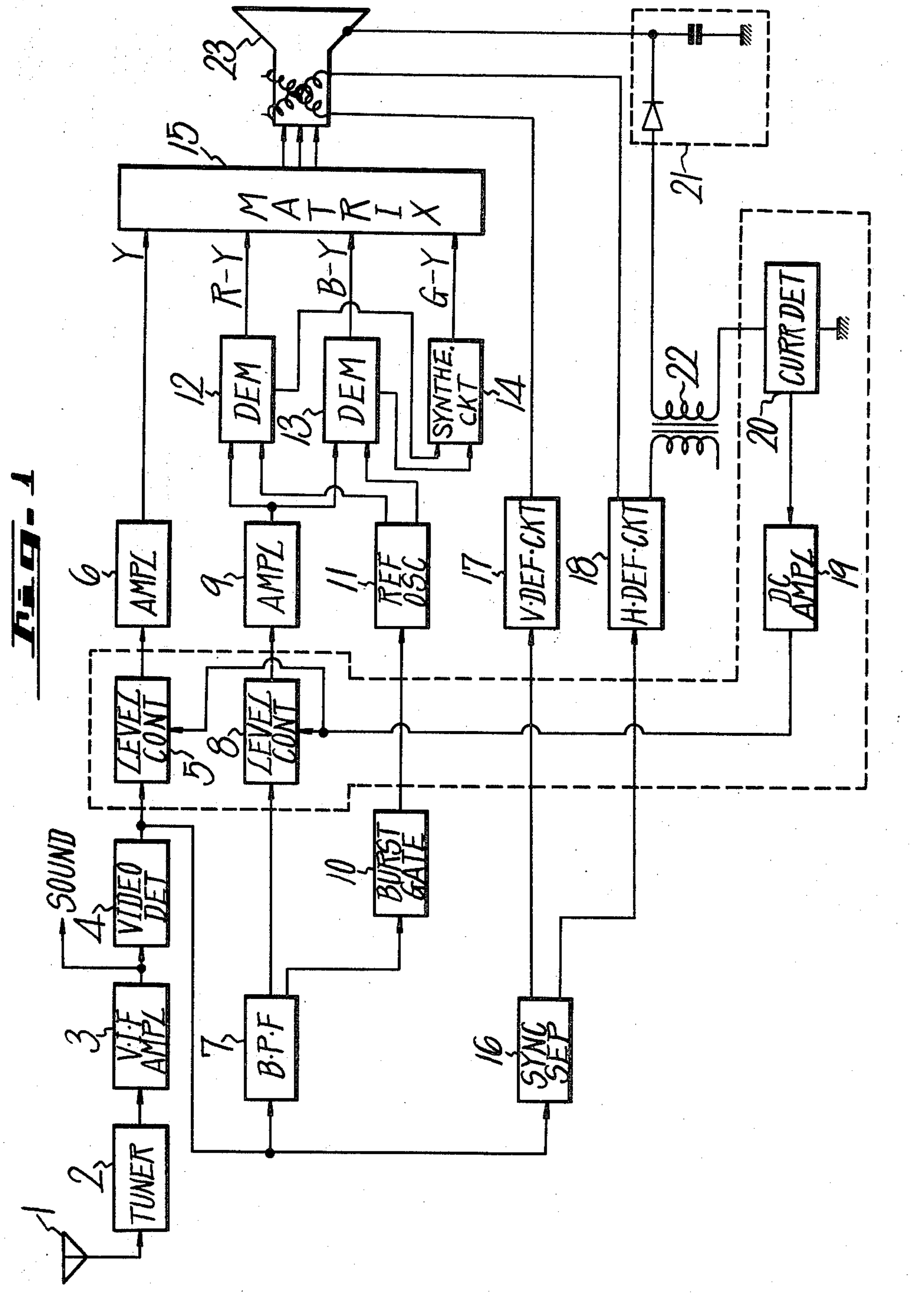
FIG. 1 is a block diagram showing a video signal control circuit for color television receivers according to this invention.

The receiver in FIG. 1 has an antenna 1 to pick up transmitted composite color television signals. A tuner 2 connected to the antenna 1 converts the radio frequency signals into video intermediate-frequency signals which are amplified by a video intermediate-frequency amplifier 3 and then detected by a video detector 4. The output of the detector 4 is supplied to a level control circuit 5 for controlling the level of a luminance signal and then is amplified by a luminance amplifier 6 to a predetermined value. After that, the luminance signal is supplied to a matrix circuit 15. In addition, one part of the output of the video detector 4 is supplied to a band-pass filter 7 to separate out the chrominance signal. The separated chrominance signal is fed to demodulators 12 and 13 through a chrominance level control circuit 8 and through a chrominance amplifier 9. An output signal from a reference oscillator 11, which is phase-controlled by a burst signal extracted by a burst gate circuit 10, is supplied to the demodulators 12 and 13, respectively, with phases corresponding to their respective demodulating axes. For example, these may be the axes of the red and blue color difference signals R-Y and B-Y, respectively. Thus, the red and blue color difference signals R-Y and B-Y are demodulated by the demodulators 12 and 13. A circuit 14 is provided for synthesizing a green color difference signal G-Y from the demodulated output color difference signals R-Y and B-Y from the demodulators 12 and 13. These color difference signals R-Y, B-Y, and G-Y are supplied to a matrix circuit 15 to be mixed with the luminance signal in predetermined ratios to provide red, blue and green color video signals, which are applied to a color cathode ray tube 23.

A synchronizing signal separator 16 separates vertical and horizontal synchronizing signals from the video signal, and the synchronizing signals are supplied to vertical and horizontal deflection circuits 17 and 18, respectively. The output of the horizontal deflection circuit 18 causes a fly-back transformer 22 to generate a high-voltage pulse, which is rectified by a rectifier circuit 21 to provide a high voltage. The high voltage thus produced is applied to an anode of the color cathode ray tube 23 to actuate it.

Figure 2:
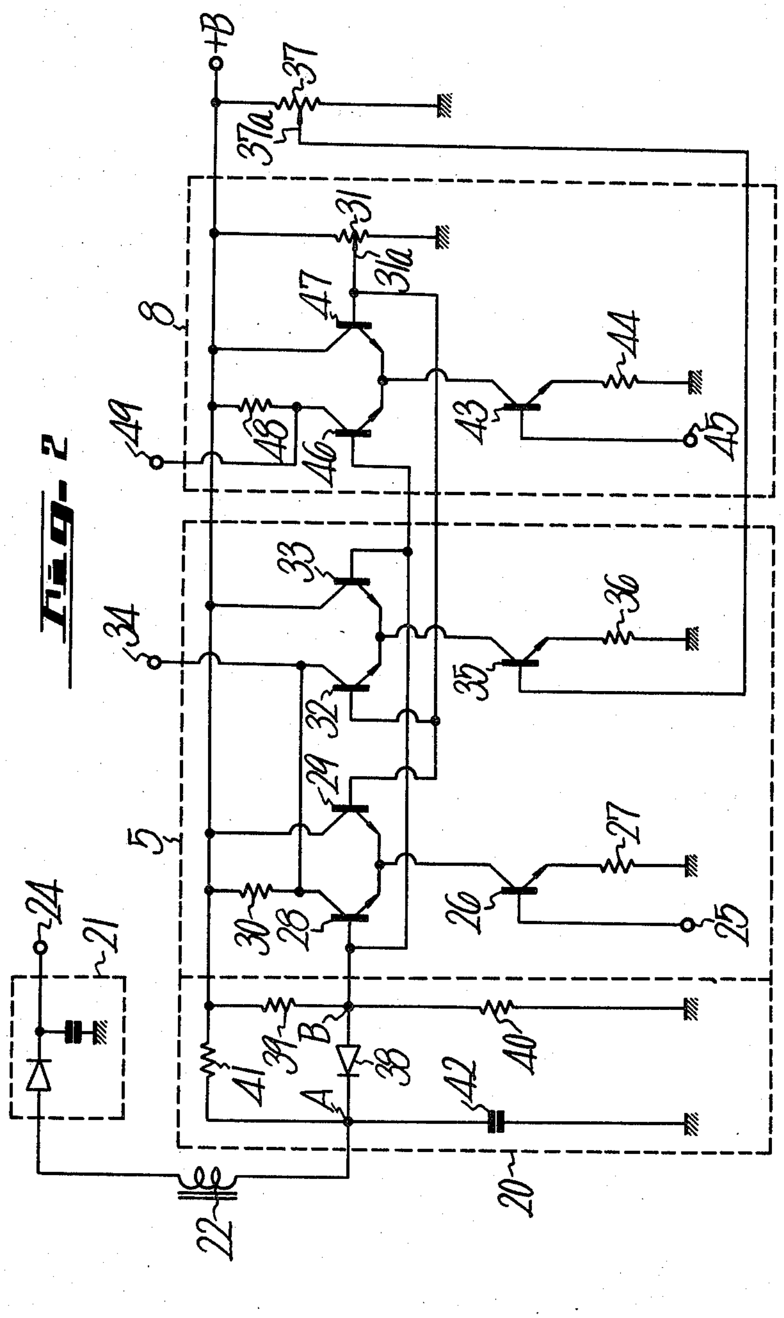
FIG. 2 is a schematic connection diagram illustrating one example of the principal part of the video signal control circuit of this invention.

In the present invention the level of the luminance signal is controlled in response to the brightness of an image on the color cathode ray tube 23 without changing the pedestal level of the luminance signal. This is done in such a manner that, when a luminance signal of high level is supplied to the color cathode ray tube 23 to increase brightness of the image greatly, the level of the luminance signal is suppressed to lower its average DC level so as to provide an excellent color image. At the same time, the level of the chrominance signal is also controlled to follow the level control of the luminance signal in order to maintain the chrominance and luminance signals in a predetermined ratio. To perform this, a detector circuit 20 is connected to the high voltage side of the fly-back transformer 22 to detect the anode current of the color cathode ray tube 23 in order to produce a DC voltage proportional to the anode current. The anode current of the color cathode ray tube 23 increases and decreases in proportion to the brightness of the picture on the screen of the color cathode ray tube 23, so that the magnitude of the DC voltage derived from the anode current detector 20 is in proportion to brightness of the picture on the tube 23. The DC voltage, which may be amplified by a DC amplifier 19, if necessary, is supplied to level control circuits 5 and 8 provided in luminance and chrominance signal paths respectively, by which the levels of the luminance and chrominance signals are varied with the output of the anode current detector circuit 20. In this case, the DC level of the chrominance signal is determined by the outputs of the demodulators 12 and 13, and the DC level is essentially of no further concern in the level control circuit 8. The DC component of the luminance signal is also transmitted after being derived from the video detector 4, so that when the pedestal level, or black level, varies with the luminance signal level changed in the level control circuit 5, an excellent color image cannot be reproduced. Therefore, only the signal level is controlled without altering the pedestal level. FIG. 2 shows one example of each of such level control circuits 5 and 8 for the luminance and chrominance signals.

In FIG. 2 an input terminal 25 for the output of the video detector is connected to the base of an NPN-type transistor 26 constituting a constant-current circuit, and the emitter of the transistor 26 is grounded through a resistor 27. The collector of the transistor 27 is connected to the emitters of two NPN-type transistors 28 and 29 that form a differential amplifier. The collector of the transistor 28 is connected to a power source terminal +B through a load resistor 30. The collector of the transistor 29 is connected to the power source terminal +B and the base is connected to a slider 31a of a variable resistor 31 connected between the power source terminal +B and ground. In this case, the base of the transistor 28 is supplied with a constant voltage $V_1$.

NPN-type transistors 32 and 33 make up a second differential amplifier. The base of the transistor 32 is also connected to the slider 31*a* of the variable resistor 31 and, therefore, is also supplied with the constant voltage $V_1$. The collector of the transistor 32 is connected to that of the transistor 28 and to an output terminal 34, which is connected to the luminance amplifier 6 in FIG. 1. Further, the collector of the transistor 33 is connected to the power source terminal +B and the emitters of the transistors 32 and 33 are interconnected, the connection point being connected to the collector of an NPN-type transistor 35 forming another constant-current circuit. The transistor 35 has its emitter grounded through a resistor 36 and its base connected to a slider 37*a* of a variable resistor 37 connected between the power source terminal +B and ground. In this case, the reference levels, namely the pedestal level of the luminance signal, is determined by the voltage fed to the base of the transistor 35.

A control voltage $V_2$, namely brightness of the color cathode ray tube, is detected and a DC voltage corresponding to the detected brightness is supplied to the bases of the transistors 28 and 33. To accomplish this in the illustrated example, one end of the high voltage side of the fly-back transformer 22 is connected through the rectifier circuit 21 to a high-voltage terminal 24 connected to the anode of the color cathode ray tube 23. The other end of the high voltage side of the fly-back transformer 22 is connected to the cathode of a diode 38 included in the anode current detecting circuit 20. The anode of the diode 38 is connected to the connection point of a pair of resistors 39 and 40 connected in series as a voltage divider between the power source terminal +B and ground, and the cathode of the diode 38 is connected to the power source terminal +B through a resistor 41 and, at the same time, grounded through a capacitor 42. The resistors 39, 40 and 41 determine a voltage at which the diode 38 becomes conductive. This voltage is such that, when brightness of the picture on the color cathode ray tube 23 rises to increase its anode current, the potential at the point A on the side of the cathode of the diode 38 lowers to cause the diode 38 to conduct. A voltage $V_2$ at the anode of the diode 38, namely at the connection point B of the resistors 39 and 40, decreases following the reduction of the potential at the point A.

The connection point of the resistors 39 and 40 is connected to the bases of the transistors 38 and 33. In this case, an output signal, derived at the output terminal 34 based on the voltage difference $V_2-V_1$ between the voltages $V_2$ and $V_1$ supplied to the bases of the transistors 28 and 29, respectively, and an output signal, derived at the terminal 34 based on the voltage difference $V_1-V_2$ between the voltages $V_1$ and $V_2$ applied to the bases of the transistors 32 and 33, are opposite in polarity.

With such an arrangement, if the collector current of the transistor 28 is taken as $i_1$, it follows that $$i_1=\frac{\alpha}{1+\exp\frac{qV}{kT}}I_S$$

where $\alpha$ is the current amplification factor of the transistor 28, $V$ is the difference $V_1-V_2$ between the voltages $V_1$ and $V_2$, $I_S$ is a current of a signal derived from the terminal 25, $q$ is the charge of an electron, $k$ is Boltzmann's constant, and $T$ is absolute temperature.

If the collector current of the transistor 32 is taken as $i_2$, it follows that $$i_2=\frac{\alpha}{1+\exp\frac{-qV}{kT}}I_O$$

where $I_O$ is a constant current flowing in the transistor 35. In this case, the current amplification factor of the transistor 32 is also identified by $\alpha$. Accordingly, if $\alpha \approx 1$, an output current $I_1$ flowing in the load resistor 30 is as follows:

$$I_1=i_1+i_2=\frac{1}{1+\exp\frac{qV}{kT}}I_s+\frac{1}{1+\exp\frac{-qV}{kT}}I_O$$

Figure 3A:
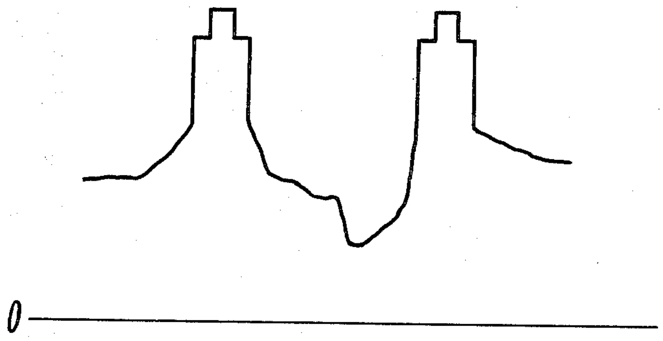
FIGS. 3A and 3B are signal diagrams for explaining this invention.
Figure 3B:
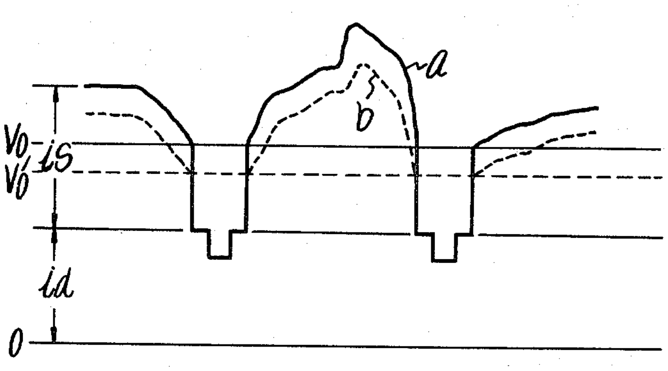

If the signal current is divided into a signal current $i_s$ higher than the reference level, for example, the pedestal level $V_B$, and a signal current $i_d$ lower than the pedestal level $V_B$ as shown in FIG. 3B, namely $I_S=i_s+i_d$, it follows that $$I_1=\frac{1}{1+\exp\frac{qV}{kT}}i_s+\frac{1}{1+\exp\frac{qV}{kT}}i_d+\frac{1}{1+\exp\frac{-qV}{kT}}I_O$$

If the constant-current value of the constant-current circuit, namely the transistor 35 is selected by adjusting the variable resistor 37 in such a manner that $I_O=i_d$, it follows that $$I_1=\frac{1}{1+\exp\frac{qV}{kT}}i_s+i_d$$

because $$\frac{1}{1+\exp\frac{qV}{kT}}+\frac{1}{1+\exp\frac{-qV}{kT}}=1$$

That is, the value of $i_d$ can be made constant irrespective of the control voltage $V(=V_1-V_2)$.

Accordingly, when a video signal such as shown in FIG. 3A is supplied to the input terminal 25, a video signal such as indicated by a curve *a* in FIG. 3B whose average DC level is $V_O$ is derived at the output terminal 34. Assuming that, at this time, the brightness on the screen of the cathode ray tube 23 increases to cause a decrease in the voltage $V_2$ supplied to the bases of the transistors 28 and 33, the gain of the transistor 28 decreases and the video signal derived at the output terminal 34 becomes such as indicated by a curve *b* in FIG. 3B in which only the current $i_s$ is higher than a reference level, namely the pedestal level $V_B$, decreases, but the current $i_d$ lower than the pedestal level remains unchanged. Consequently, the pedestal level, itself, does not vary and a video signal whose average DC level has lowered down to $V_O'$ is obtained.

Further, in the present example, the chrominance signal input terminal 45 is connected to the base of an NPN-type transistor 43 forming a constant-current circuit and the emitter of the transistor 43 is grounded through a resistor 44. Two more NPN-type transistors 46 and 47 make up a third differential amplifier. The emitters of the transistors 46 and 47 are connected together to the collector of the transistor 43. Further, the transistor 46 is connected to the power source terminal +B through a load resistor 48 and the collector of the transistor 46 is connected to an output terminal 49 which, in turn, is connected to the input side of the chrominance amplifier 9, and the collector of the transistor 47 is connected to the power source terminal +B to provide the level control circuit 8 for the chrominance signal. The base of the transistor 46 is connected to the connection point B of the resistors 39 and 40 and supplied with the control voltage $V_2$, while the base of the transistor 47 is connected to the slider 31*a* of the variable resistor 31 and supplied with the constant voltage $V_1$. That is, the gain of the transistor 46 decreases with a decrease in the voltage at the point B to control the chrominance signal derived at the output terminal 49 correspondingly.

Accordingly, in the present example the luminance and chrominance signals are simultaneously controlled based on the brightness detected signal of the color cathode ray tube, but the pedestal level of the video signal remains unchanged.

With the present invention above described, the levels of the luminance and chrominance signals are simultaneously changed in accordance with the brightness on the screen of the color cathode ray tube and these signals are held in normal ratio and, at the same time, the pedestal level does not vary to provide a faithful color picture at all times.

It will be apparent that many modifications and variations may be effected without departing from the scope of the novel concepts of this invention.

What is claimed is:

1. In a color television receiver comprising:
 - A. Means to demodulate a carrier to derive a composite color video signal therefrom;
 - B. Means to separate a luminance signal and a chrominance signal from the composite color video signal for amplification and color demodulation whereby both the luminance and chrominance signals are supplied to a color cathode ray tube for producing color images on a screen of said tube; and
 - C. A video signal control circuit arrangement comprising:
   1. first level controlling means for changing the level of said luminance signal without varying the pedestal level of said composite color video signal,
   2. second level controlling means for changing the level of said chrominance signal, and 3. means for managing said first and second level controlling means simultaneously to change the levels of said luminance and chrominance signals respectively in response to brightness of said color images on the screen.

2. A video signal control circuit arrangement according to claim 1 in which said first level controlling means comprises:

A. A first differential amplifier comprising:
1. a first input connected to a controllable voltage source, and
2. a second input connected to be actuated by current in said cathode ray tube; and B. A constant current circuit connected in series with said differential amplifier and energized by said luminance signal to be controlled thereby.

3. A video signal control circuit arrangement according to claim 2 comprising, in addition:

A. A second differential amplifier having a common output connection with said first differential amplifier and inverse input connections to said first differential amplifier; and B. A second constant current circuit connected in series with said differential amplifier and energized by a control voltage to set the pedestal level.

4. A video signal control circuit arrangement according to claim 3 in which said second level controlling means comprises:

A. A third differential amplifier comprising:
1. a separate output circuit, and
2. a pair of inputs in parallel with said inputs of said first differential amplifier; and B. A third constant current circuit connected in series with said third differential amplifier and energized by said chrominance signal.

5. A video signal control circuit arrangement according to claim 1 in which said first and second level controlling means change the levels of said luminance and chrominance signals respectively with the same tendency of change.

6. A video signal control circuit arrangement according to claim 5 in which said first and second level controlling means change the levels of said luminance and chrominance signals in response to a control voltage supplied thereto.

7. A video signal control circuit arrangement according to claim 6 in which said managing means produces said control voltage in response to brightness of said color images on the screen and applies said control voltage to said first and second level control means.

8. A video signal control circuit arrangement according to claim 7 in which said managing means includes current detecting means for detecting the value of an anode current of said color cathode ray tube to produce said control voltage in response to brightness of said color images on the screen.

9. A video signal control circuit arrangement according to claim 8 in which said receiver comprises a flyback transformer through which said anode current flows and said current detecting means is connected to said transformer.

* * * * *